(12) United States Patent
Garg et al.

(10) Patent No.: US 6,258,137 B1
(45) Date of Patent: *Jul. 10, 2001

(54) CMP PRODUCTS

(75) Inventors: Ajay K. Garg, Northborough; Brahmanandam V. Tanikella, Natick; William R. Delaney, Westborough, all of MA (US)

(73) Assignee: Saint-Gobain Industrial Ceramics, Inc., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/413,518

(22) Filed: Oct. 6, 1999

Related U.S. Application Data

(63) Continuation-in-part of application No. 08/191,737, filed on Feb. 4, 1994, now Pat. No. 6,048,577, which is a continuation of application No. 07/831,588, filed on Feb. 5, 1992, now abandoned.

(51) Int. Cl.$^7$ ............................... C09G 1/00; C09G 1/02; B24D 3/00
(52) U.S. Cl. .................................. 51/298; 51/309; 106/3; 438/692; 438/693; 501/128; 428/404
(58) Field of Search .............................. 51/295, 298, 307, 51/309; 106/3; 438/692, 693; 501/127, 128

(56) References Cited

U.S. PATENT DOCUMENTS

| | | |
|---|---|---|
| 4,012,337 | 3/1977 | Mitchell . |
| 4,019,914 | 4/1977 | Esper et al. . |
| 4,062,693 | 12/1977 | Berger . |
| 4,172,809 | 10/1979 | Triki . |
| 4,737,411 | 4/1988 | Graves et al. . |
| 4,786,555 | 11/1988 | Howard, Jr. . |
| 4,818,515 | 4/1989 | Ceresa et al. . |
| 4,956,015 | 9/1990 | Okajima et al. . |
| 4,997,461 | 3/1991 | Markhoff-Matheny . |
| 5,042,991 * | 8/1991 | Kunz et al. ............................ 51/309 |
| 5,131,923 * | 7/1992 | Markhoff-Matheny et al. ...... 51/309 |
| 5,213,591 * | 5/1993 | Celikkaya et al. .................... 51/309 |
| 5,454,844 * | 10/1995 | Hibbard et al. ....................... 51/309 |
| 5,474,583 * | 12/1995 | Celikkaya ............................. 51/309 |
| 5,527,423 | 6/1996 | Neville et al. . |
| 5,609,657 | 3/1997 | Ishitobi . |
| 5,651,801 * | 7/1997 | Monroe et al. ....................... 51/309 |
| 5,672,097 * | 9/1997 | Hoopman .............................. 51/309 |
| 5,932,486 | 8/1999 | Cook et al. . |
| 6,048,577 * | 4/2000 | Garg ....................................... 106/3 |

* cited by examiner

Primary Examiner—Michael Marcheschi
(74) Attorney, Agent, or Firm—David Bennett

(57) ABSTRACT

CMP processes and products employ aluminas comprising alpha alumina particles having a particle width of less than 50 nanometers and a surface area of at least 50 $m^2/gm$.

8 Claims, 2 Drawing Sheets

CMP PRODUCTS

This Application is a continuation-in-part of application Ser. No. 08/191,737 filed Feb. 4, 1994 U.S. Pat. No. 6,048,577 which is a continuation of application Ser. No. 07/831,588 filed Feb. 5, 1992 now abandon.

BACKGROUND OF THE INVENTION

This invention relates to CMP ("chemical mechanical planarization") materials and specifically to CMP materials comprising as the abrasive alpha alumina powders.

CMP is a process that is used to prepare semiconductor products of great importance in a wide range of electronic applications. Semiconductor devices are typically made by depositing a metal such as copper in spaces between non-conductive structures and then removing the metal layer until the non-conductive structure is exposed and the spaces between remain occupied by the metal. The demands placed on the abrasive are in many ways in conflict. It must remove the metal but preferably not the non-conductive material. It must remove efficiently but not so quickly that the process cannot be terminated when the desired level of removal has been reached.

The CMP process can be carried out using a slurry of the abrasive in a liquid medium and it is typical to include in the slurry, in addition to the abrasive, other additives including oxidizing agents, (such as hydrogen peroxide, ferric nitrate, potassium iodate and the like); corrosion inhibitors such as benzotriazole; cleaning agents and surface active agents. It can also however be carried using a fixed abrasive in which the abrasive particles are dispersed in and held within a cured resin material which can optionally be given a profiled surface.

The CMP process can be applied to any layered device comprising metal and insulator layers each of which is in turn deposited on a substrate in quantities that need to be reduced to a uniform thickness and a highly uniform surface roughness ($R_a$) level. CMP is the process of reducing the deposited layer to the required thickness and planarity. The problem is that the best material removal abrasives leave a rather unacceptably rough surface or achieve the material removal so rapidly that the desired termination point is often overshot. Those abrasives that remove material at a moderate rate may lack selectivity or leave a poor surface.

In the past these conflicting demands have been compromised by the use of relatively soft abrasives such as gamma alumina and silica. These slow down the rate of removal but are not very discriminating as between metal and non-conductive material. Alpha alumina with an average particle size of about 100 nanometers has been proposed and this is found to be very discriminating in preferentially removing metal rather than non-conductive material. Unfortunately however it is also very aggressive such that it is very difficult to avoid "dishing" which is the formation of a depression in a metal layer lying between adjacent non-conductive material structures. Dishing adversely affects the performance of the semi-conductor and is therefore considered to be very undesirable.

A need therefore exists for an abrasive that can be presented to a substrate in a CMP application that will remove metal selectively and relatively slowly such that dishing can be minimized.

DESCRIPTION OF THE INVENTION

The present invention provides a CMP process which comprises polishing a substrate comprising a metal and a non-conductive material using an abrasive that comprises an alumina powder in which the alumina particles of the powder have a silica coating and in which the powder has a BET surface area of at least 50 $m^2/gm$, an alumina content of at least 92% by weight and an alpha alumina content of at least 95% by weight and wherein at least 90% of the particles have ultimate particle widths of not more than 50, for example from 20 to 50, nanometers with no more than 10% having ultimate particle sizes greater than 100 nm. Such alumina powders with this particle size range and surface area are sometimes referred to hereafter as "nano-alumina" powders or particles for convenience and brevity.

The alumina powder particles are provided with a silica coating but it is understood that the term "silica" as used herein includes, besides silicon dioxide, complex oxides of silica with metal oxides such as mullite; alkali metal aluminosilicates and borosilicates; alkaline earth metal silicates and the like. Thus a recited percentage of "silica" may in fact also comprise other components besides silicon dioxide.

The alpha alumina content of the nano-alumina powder is at least 90%, and preferably at least 95%. The balance is provided by silica and minor amounts of other phases of alumina which are intermediates in the conversion of boehmite to the alpha phase. They are the result of incomplete conversion during the firing process which is minimized to ensure that the particles are not excessively agglomerated and therefore more difficult to separate.

In discussing the "width" of such nano-alumina particles hereafter it is to be understood that, except where the context clearly indicates the contrary, it is intended to refer to the number average value of the largest dimension perpendicular to the longest dimension of a particle. In practice it is found that the nano-alumina particles have a somewhat blocky appearance such that the particle often appear to be equiaxed. The measurement technique is based on the use of a scanning, or a transmission, electron microscope such as a JEOL 2000SX instrument.

Alpha alumina is the hardest and densest form of alumina and is formed by heating other forms of alumina or hydrated alumina at elevated temperatures. It is therefore the form of alumina that is best adapted to abrasive applications.

Alpha alumina is conventionally formed by a fusion process in which an alumina hydrate is heated to above about 2000° C. and then cooled and crushed. Heating at these high temperatures causes the crystals of alpha alumina to grow to several microns and to sinter together to produce an extremely hard material. The high density and the hardness of the alumina particles produced in this way make the crushing process very difficult. To get small particles, it is necessary to break the sinter bonds and, if even smaller particles are needed, perhaps of the order of a few microns or less in size, even to crush the primary crystals themselves. This is of course an extremely difficult task requiring much expenditure of energy. While the sinter bonds are very difficult to break, especially when sintering to essentially theoretical density has occurred, the fracture of the ultimate crystals themselves is even harder.

Recently the development of sol-gel, and particularly seeded sol-gel, processes have permitted the production of alumina with a microcrystalline structure in which the size of the ultimate crystals, (often called microcrystallites), is of the order of 0.1 micrometer or 100 nanometers. Such seeded processes incorporate seed particles that are capable of nucleating the conversion of boehmite, (alpha alumina monohydrate), to the alpha alumina phase at relatively low temperatures. The nature of the seed particle in terms of its crystal shape and lattice dimensions should be as close as possible to that of the target material for the nucleation to be efficient so that the logical choice is alpha alumina itself.

Virtually as soon as the alpha phase is generated, in the form of particles comprising microcrystallites of alpha alumina less than one micron in size, there is a tendency for the particles to sinter together where they contact one another. This tendency accelerates with increasing temperature. Keeping the temperature of formation of the alpha phase low therefore minimizes the degree to which the particles are sintered together and thus makes crushing to the ultimate particles size somewhat easier.

In U.S. Pat. No. 4,657,754, Bauer et al. teach firing a dried seeded sol-gel alumina to convert at least a portion to the alpha phase and then crushing the dried product to a powder of alpha particles, taking care not to cause excessive sintering or particle growth during the firing. This ensures that little sintering will have taken place. Thus the crushing will need to break only a few sinter bonds and no ultimate particles. Firing to complete the conversion can then be undertaken with the product already in its powder form. This is still a difficult and expensive operation however and limited essentially by the size of the ultimate particles of alpha alumina in the product, (100 nm). Such particles are however much larger than the nano-alumina particles to which this Application pertains.

Fine alpha alumina powder is widely used as a polishing, or lapping abrasive. In such lapping applications, the finer and more uniform the particle size of the powder, the better the finish that can be attained. However for CMP applications such fine alpha alumina as is produced by the Bauer process referred to above is extremely aggressive and readily results in dishing. The present invention addresses this problem by providing an alpha alumina-containing abrasive with smaller particle sizes, (the nano-alumina particles), and that results in less aggressive cutting. Surprisingly enough it is also selective enough to be used conveniently in CMP applications.

The nano-alumina abrasive powder can be used in the form of a slurry which is applied to the surface to be polished at the same time as a polishing pad is moved over the surface. Thus according to one embodiment, the invention comprises a CMP process in which a deformable polishing pad is moved in contact with a surface to be polished while a slurry comprising a nano-alumina powder in which the alumina particles of the powder have a silica coating and in which the powder has a BET surface area of at least 50 $m^2/gm$, an alumina content of at least 92% by weight and an alpha alumina content of at least 90% by weight and wherein at least 95% of the particles have ultimate particle widths of from 20 to 50 nanometers with less than 5% having ultimate particle sizes greater than 100 nm.

According to an alternative embodiment the alpha alumina powder is presented to the surface to be given a CMP treatment using a fixed abrasive comprising a nano-alumina powder in which the alumina particles of the powder have a silica coating and in which the powder has a BET surface area of at least 50 $m^2/gm$, an alumina content of at least 92% by weight and an alpha alumina content of at least 90% by weight and wherein at least 95% of the particles have ultimate particle widths of from 20 to 50 nanometers, with less than 5% having ultimate particle sizes greater than 100 nm, dispersed in a cured binder. The binder/abrasive can be present as a coating on the outer portion of a wheel, for example the rim, or it may be deposited as a coating on a planar surface of a flexible sheet material such as a cover, disc or belt before the binder is cured to give an abrasive tool. The surface of the binder/abrasive layer can be smooth or it may be given a surface structure comprising a plurality of shapes in random or repeating order before the binder is cured. Such surfaces are said to be "engineered" since they can be pre-determined or shaped to have any configuration demanded by the application and the substrate surface to which it is to be applied.

Production of Nano-Alumina

A suitable process by which the nano-alumina particles can be made comprises dispersing in a boehmite gel a material, particularly silica, that forms a barrier around the boehmite particles, at a temperature below that at which boehmite converts to alpha alumina, said material being incorporated in an amount sufficient to inhibit particle size growth after formation of alpha alumina from the boehmite, then drying and firing the gel at a temperature to convert at least the major proportion of the alumina to the alpha phase in the form of loose aggregates of ultimate particles with sizes from about 20 to about 50 nanometers.

These aggregates are described as "loose" by which is meant that they can be relatively easily comminuted to recover the primary particles which have a width that is less than about 50 nanometers.

The firing should not be at a temperature to cause significant growth or over-sintering of the particles, (which would of course cause them to be extremely difficult, if not impossible, to separate to the primary particles). In fact the barrier coating makes the sintering of such products occur only at an elevated temperature of about 1400° C. or higher and the usual firing temperature employed is preferably below 1300° C.

The barrier material is believed to form a very thin coating around the particles of boehmite in the gel which inhibits migration of alumina across the particle boundary and thus prevents, or at least significantly inhibits, growth of the particle as it is converted to the alpha phase. The result is therefore the formation of alpha alumina particles with sizes of the order of those in the originating boehmite gel.

The preferred glass forming barrier material is most conveniently silica but other glass forming materials capable of acting in the above way are within the purview of the present invention. These could include boron containing materials such as borosilicates and the like. For the purposes of this description, the primary emphasis will be on the most readily available and easily usable materials based on silica.

When silica is used as the barrier material, the amount incorporated is preferably from about 0.5 to about 10% by weight based on the weight of the alumina in the gel. It is usually preferred to disperse the silica in a sol or a gel of the boehmite so as to maximize the intimacy of the dispersion between the components.

The boehmite can be any of those currently available which have dispersed particle sizes of the order of a few tens of nanometers or less. Clearly the boehmites with the most consistently fine particles sizes are preferred since these do not have the hard-to-disperse agglomerates that characterize some of the other commercial products.

It appears that the silica interacts with the surface of the boehmite particles, probably by formation of a glass, and this slows the conversion to alpha alumina and the subsequent growth of these alpha particles. Because of this particle growth suppression mechanism there is little reason to keep the temperature low. Thus more rapid conversion can be obtained using higher temperatures without adverse effect on the alpha crystal size.

Addition of the silica to a boehmite sol and the gelation of the sol mixture obtained is an important preferred feature of the present invention since this permits a complete and uniform dispersion to be achieved.

In addition the silica becomes attached to the essentially colloidal sized boehmite particles which are inhibited from significant further growth.

When the conversion to alpha has occurred the particles are in the form of loose agglomerates of primary particles with a width of about 50 nanometers or less and may appear under a scanning electron microscope to have the form of a series of rod-shaped or cluster agglomerates, or sometimes a rough network of elements comprising the primary particles. These loose agglomerates or aggregates are relatively easily broken down to the individual particles, for example by wet or dry milling. They are relatively easily broken up because of the formation of a silica-containing barrier phase at the crystal boundaries which inhibits the formation of a sinter bond between alpha alumina ultimate particles. This results in a nano-alumina product with a number average particle width of less than about 50 nanometers. A wet milling process can often lead to the formation of a minor amount of hydrated alumina, for example alumina trihydrate, by surface hydrolysis of the alpha alumina. Such hydrates will revert to alpha alumina upon firing of course and for the purposes of this specification, such surface modified alpha alumina is not distinguished from unmodified alpha alumina.

The process leads to the production of alpha alumina particles of a novel, fine, uniform particle size. Prior art alpha alumina powders milled to give a high BET surface area are found to comprise a wide range of particle sizes to the extent that these often appear to be in a bimodal the predominant alumina phase. The process therefore also provides a fine alumina powder having a BET surface area of at least 50 $m^2$/gm. and preferably at least 100 $m^2$/gm., in which at least at least 90% of the total alumina phase weight is provided by particles of microcrystalline alpha alumina, and wherein at least 90% of the particles have widths of from not greater than 50, and preferably from 20 to 50, nanometers and less than 10% have ultimate particle widths greater than 100 nanometers.

The fraction of these large particles is measured by electron, (scanning or transmission), microscope analysis of an ultramicrotomed sample and an assessment of the percentage of the total field occupied by particles, occupied by particles having ultimate particle widths greater than 100 nanometers. The balance of the powder weight is largely provided by the barrier material which, as indicated above, can be any material capable of inhibiting particle growth and/or sintering during the conversion to alpha alumina. Where the barrier comprises a silica-containing material such as a mullite this can represent as much as 15% by weight of the total weight or even more. Usually however, operating with the preferred minor amounts of silica sol specified above, the alumina represents about 95% of the weight of the powder.

It is also possible that the non-alpha alumina in the alumina phase of the nano-alumina powder may be provided by alumina phases intermediate between the boehmite and alpha phases, such as gamma alumina or theta alumina.

The amount of silica present should be carefully controlled because if too much is added there will be a tendency to react with the bulk of the alumina and much of the final product will have the relatively useless chemical composition of mullite or other silica-containing phase. On the other hand too little will not be effective to limit alpha particle growth. In practice it is found that an amount from about 0.5 to about 8, and preferably from about 1 to about 5 wt. % of the solids content of the gel should be silica. Generally it is preferred that the amount of silica in the final product should be less than about 10 wt % and preferably should be less than about 8, and most preferably less than about 5 wt %.

The silica can be added in the form of colloidal silica, a silica sol or a compound that under the reaction conditions will liberate such a colloid or sol and form a glassy coating around the alumina particles. Such compounds could include organosilanes such as tetraethyl orthosilicate, and certain metal silicates. Generally alkali metal silicates are less preferred. The form of the silica in the sol should preferably be of a particle size that is at least similar to, or preferably smaller than, that of the boehmite, that is, of the order of a few nanometers at most.

Adding the silica in the form of a sol to the boehmite sol ensures the most uniform and effective distribution of the silica such a minimum amount can be used.

The gel may be dried at lower temperatures before it is calcined, which is commonly done at a temperature of about 700° C., over a period of several hours. The calcination drives off the water in the gel, promotes formation of the glassy surface barrier and begins conversion of the boehmite to the gamma alumina phase. The calcination process can however be carried out under other conditions with higher or lower temperatures if desired, or even omitted altogether.

Firing of the dried gel can occur under any conditions that will bring about phase conversion to alpha alumina. Generally unseeded boehmite will convert to the alpha phase at temperatures of from about 1000 to 1300° C. with the time to accomplish the conversion decreasing with increasing temperature. In the present invention the preferred firing temperature is from about 1100° C. to 1250° C. and the time taken at that temperature will be somewhat longer than would be usual for such aluminas due to the presence of the silica. The firing may require as much as 40 hours at the lower end of the temperature range and as little as one minute at the upper end of this range. Firing at the lower end of the range such as from about 1100 to about 1250° C. minimizes the tendency for the particles to form aggregates. In this temperature range, a time at the firing temperature of from about 1 minute to about 40 hours is needed to reach the desired level of conversion to alpha alumina without formation of excessive amounts of intractable (as opposed to loose), agglomerates.

In firing, the time at the firing temperature is very important. A slow ramp-up to the firing temperature may dictate the use of a shorter time at the firing temperature and this ramp-up is often a function of the equipment used. Generally a rotary furnace needs a much shorter time to reach the desired temperature while a box furnace can take a significantly longer time. Thus for reasons of control and reproducibility it may often be preferred to use a rotary furnace. In addition a large sample will need longer to reach a uniform body temperature than a smaller one. The temperature/time schedule actually used will therefore be dictated by the circumstances, with the above considerations in mind.

Comminution can be accomplished in a mill using conventional techniques such as wet or dry ball milling or the like. Alternatively it is possible to take advantage of presence of mullite or other aluminosilicate phases at the particle boundaries within the agglomerates to make comminution easier. Such phases will usually have different thermal expansion properties from alpha alumina and it is often possible to rupture such boundary layers by cycling the product through high and low temperatures to create expansion stresses. Such stresses may sometimes themselves be adequate to bring about comminution. It may also be possible to subject these silica-containing boundaries to chemical stresses by a hydrothermal treatment or by treating the product with a base or an acid. More commonly however such thermal or chemical comminution will need to be followed by some sort of physical comminution to complete the breakdown to a powder with a number average particle width of less than 50 nanometers.

The very fine particle sizes obtained by the process are believed to be unique in that they combine a high surface area in excess of 50, and more often 120 $m^2$/gm. with a particle size distribution such that less than about 10% by weight of the particles have an ultimate particle size greater than 100 nm. Since milling is typically done using low purity alpha alumina media, it is believed that a significant proportion of the 100 nm+particles observed are more likely derived from attrition of the media and not from alpha alumina obtained by the conversion of the boehmite. By contrast products obtained by milling larger alpha alumina particles typically have a much wider spread of particle sizes with large number of particles greater than 100 nm in size.

It is preferred that the final milling used to separate the nano-alumina particles is performed using low-purity alpha alumina, (about 88% alpha alumina), or zirconia media. "Zirconia" media is understood to include media made from a zirconia stabilized by additives such as yttria, rare earth metal oxides, magnesia, calcia and the like. This is thought to be possibly due to the way in which high-purity alumina media break down during milling to produce quite large fragments. By contrast low-purity alumina media typically produce micron-sized particles and zirconia media are so tough they appear to produce almost no fragments at all.

Use of Nano-Alumina in CMP Slurry

One embodiment of the present invention is directed to slurries of nano-alumina that are useful in CMP processes and to CMP processes employing nano-alumina abrasive powders.

CMP (chemical-mechanical polishing) slurries usually comprise the abrasive in an oxidizing liquid medium which is often a solution of hydrogen peroxide in deionized water. The slurry often contains in addition a complexing agent such benzotriazole. When the nano-alumina is present in such a slurry the concentration is typically from 1 to 15%, and preferable from 2 to 10% by weight of the total slurry weight. The slurry is used in conjunction with a pad that moves over the surface to be polished as the slurry is fed on to the surface of the workpiece.

Use of Nano-Alumina in Fixed Abrasives for CMP Applications

In recent times however there has been a move to replace the conventional slurry/pad combination with a fixed abrasive in which the abrasive is in the form of a composite with the particles of abrasive being held in an easily erodable binder matrix. This composite can for example provide the grinding surface of an abrasive wheel.

It can also take the form of a layer deposited on and adhered to a flexible substrate, to which a regular pattern has been applied for example by a molding or embossing process. These latter are often referred to as "engineered" abrasives. The fixed abrasives are then moved relative to the surface to be treated rather as a pad would be in the conventional CMP process. However in place of the slurry the liquid fed to the surface is deionized water or an aqueous oxidizing solution. This is still a true CMP operation as the term is used herein and the results are the same. Such processes are however potentially much more efficient in the use of abrasive and the ease of treatment or disposal of the waste.

DESCRIPTION OF PREFERRED EMBODIMENTS

Figure 1:
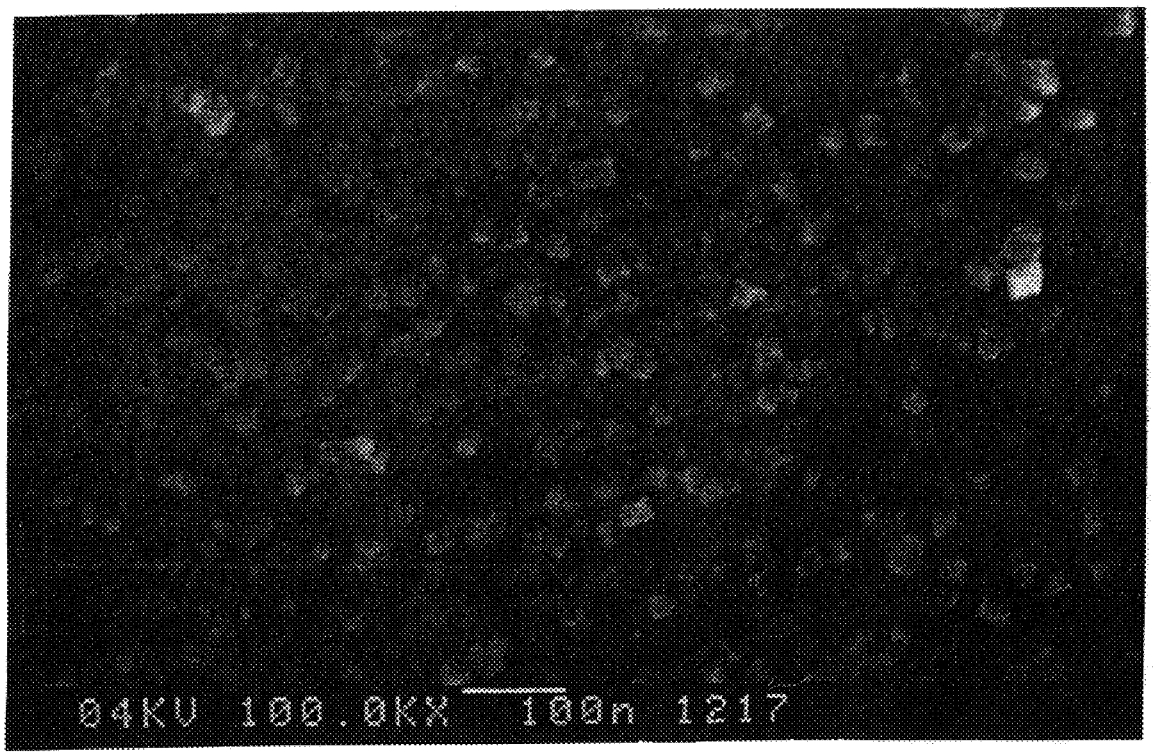
FIG. 1 shows a nano-alumina powder useful in the CMP processes of the invention. As can be seen it comprises highly uniform 20–50 nm particles with very few larger than 50 nm in width. Some appear to be loosely agglomerated but the individual particle structure is clearly visible.

The invention is now further described with reference to the following Examples which are intended for the purposes of illustration only and should not be taken as implying any necessary limitation on the essential scope of the invention.

Testing for CMP Suitability

In manufacturing semiconductor components it is conventional to deposit on a silicon wafer substrate a number of layers of different conductive and non-conductive materials. As deposited the layers are often uneven and need to be "planarized" to give a surface with as low an $R_a$, (a measure of surface roughness), as possible.

In a typical CMP operation, the task is to remove material efficiently while at the same time leaving as unblemished a surface as possible. While efficiency is important, control is even more significant since the thickness of the layers deposited is measured in Angstroms and too aggressive a removal rate can make it difficult to stop exactly when the desired thickness of the layer has been achieved. Thus steady but controlled removal is the goal.

This steadiness is also significant when the deposited material overlies a previously deposited layer on which a pattern, such as a circuit, has been etched. When the overlying layer has been removed to the level of the previously deposited etched layer, it is important that the erosion does not continue such that the filled area between remaining etched structures of the previous layer is not further eroded, a process known as "dishing".

If the selectivity of removal between the prior and the overlying layers is marked and the rate of removal of the overlying layer is high, the potential for dishing is great and this of course results in a highly non-planar surface upon which a subsequent layer may be deposited.

In evaluating the CMP potential of a particular abrasive therefore we set up two types of test. The first was intended to evaluate the selectivity of removal and the second was intended to evaluate the potential for dishing.

The selectivity tests were carried out on samples having a surface to be planarized that was made of either copper or an insulating layer of silicon dioxide, (hereinafter referred to the "oxide" layer). The samples were made by depositing a 10,000 Å layer of the oxide on a semiconductor grade silicon wafer that had been thoroughly cleaned. This provided the oxide sample for evaluation or removal rate. Planarized versions of these oxide layer samples were then given a 400 angstrom layer of a titanium adhesion layer followed by a 10,000 Å layer of copper. This copper surface was used to evaluate the rate of removal of copper.

The dishing tests were carried out on silicon wafer samples that had been given the above oxide layer but to a depth of 16,000 Å. The oxide layer was planarized and then etched to give a pattern that was 2,200 Å deep. Over this etched layer was deposited a 10,000 Å layer of copper. This copper surface was then planarized until the oxide surface was exposed and the depth of dishing that resulted was assessed.

EXAMPLE 1

Selectivity Evaluation

A CMP slurry according to the invention was evaluated against two commercial alumina slurries in the removal of copper and oxide on samples made using the procedures outlined above.

In each case 2000 gm of an alumina slurry containing 10% solids by weight was mixed with 250 ml of 30% hydrogen peroxide solution and 4 gm of benzotriazole (both purchased from VWR Scientific Products). Deionized water was added to make a final slurry weight of 4000 gm. The three resulting slurries were then evaluated on a laboratory scale polisher. A Rodel IC1400 stacked perforated polishing pad was used for the polishing tests.

A polishing pressure of 34.5 Kpa, (5 psi), a relative surface speed of the workpiece of approximately 1.2 m/sec, and a slurry flow rate of 100 ml/minute were used. The material removal rate (MRR) was measured using a balance with a repeatability of +/−10 micrograms and was converted into Å/min. The removal rates obtained with the three materials was as follows:

| ALUMINA SOURCE | Cu REMOVAL | Oxide REMOVAL | SELECTIVITY |
|---|---|---|---|
| COMP-1 | 640 Å/Min | 90 Å/Min | 7 |
| COMP-2 | 590 Å/Min | 340 Å/Min | 1.7 |
| INVENTION-1 | 360 Å/Min | 50 Å/Min | 7 |

The alumina used in Comp-1 was obtained from Saint-Gobain Industrial Ceramics, Inc. under the product code SL 9245. The particle size was of the order of 100 nanometers or so with a wide particle size range. It was obtained by the Bauer process described above.

The Comp-2 alumina was "Product Code Masterprep" purchased from Buehler Limited. It is believed to be predominantly gamma alumina.

Figure 2:
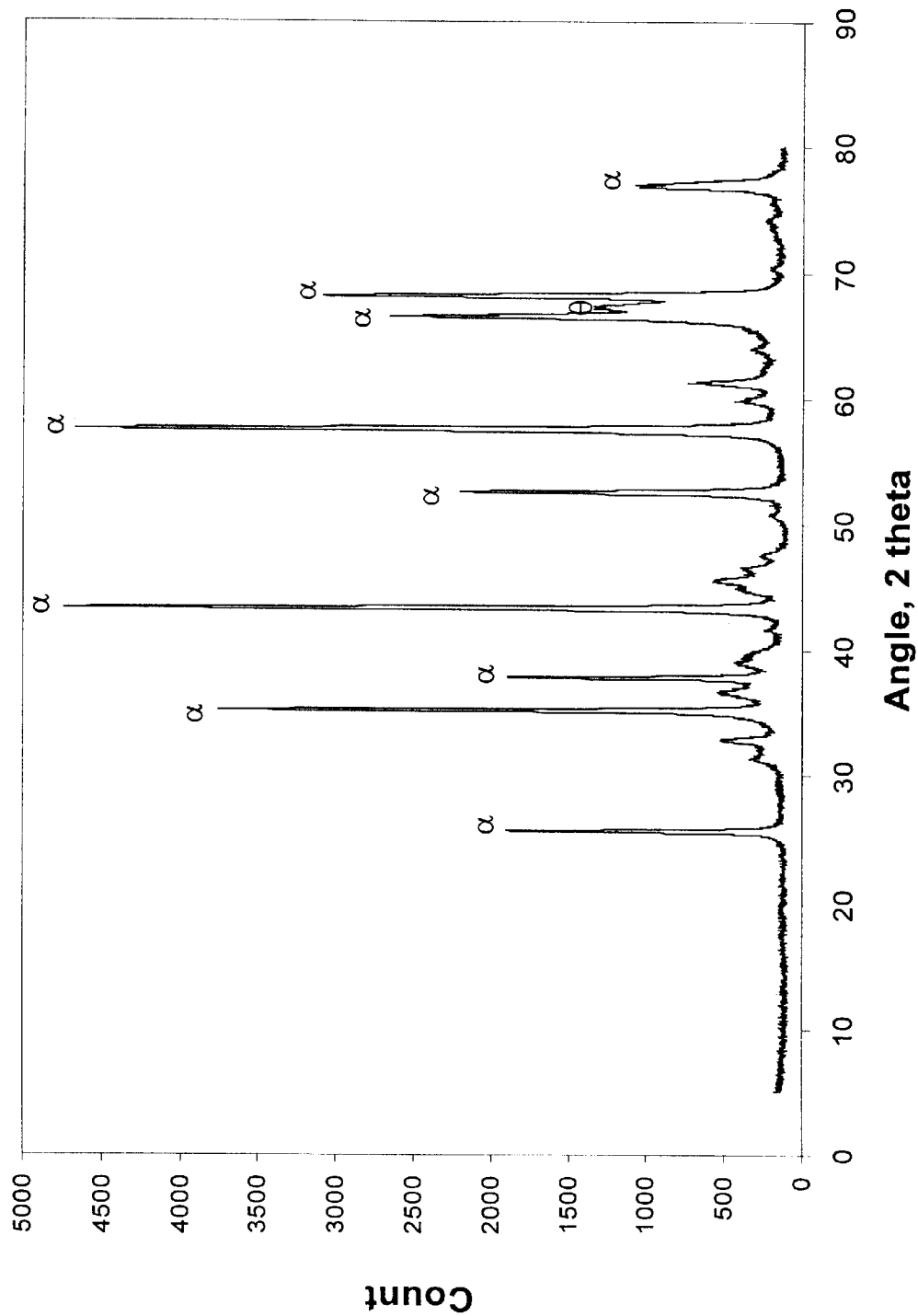
FIG. 2 shows the X-Ray diffraction trace for a nano-alumina useful in the production of CMP products according to the invention.

The alumina used in Invention-1 is shown in FIG. 1 and was obtained by the process described above for the production of nano-alumina. The X-Ray diffraction trace of the nano-alumina is shown in FIG. 2 which indicates that the alpha alumina content is in excess of 80%. The actual level is difficult to assess accurately because the peak associated with the theta-alumina transitional form is not readily separated from two adjacent alpha alumina peaks. The nano-alumina comprised 2% by weight of silica as a coating around the particles. The silica was added to a boehmite dispersion and the silica-coated boehmite particles were fired at 1150–1200° C. for 10 hours, after which the particles were cooled to room temperature and milled using zirconia media for 27 hours in a polyurethane-lined Sweco mill.

The data shows that the rate of removal is reduced by comparison with the larger particle size alpha alumina as a result of the smaller particle size but the selectivity is fully maintained. Thus when removing material to the point at which the underlying layer is revealed, it becomes possible to identify the endpoint accurately and terminate the planarization appropriately.

The gamma alumina product had fast removal rates but hardly any selectivity as between the copper and the oxide materials. The nano-alumina product was the only one that permitted controlled, steady oxide removal while retaining selectivity.

EXAMPLE 2

Dishing evaluation

The same three aluminas that were evaluated in Example 1 were then evaluated for dishing in the manner described above. The test format was exactly that described in Example 1 except that the material tested was the layered product described above and the end-point was the first point at which both metal and insulating oxide material were visible. Measurements of "dishing" made using a profilometer obtained from Tencor Corporation. The measurements were made of the depth of dishing between adjacent features of varying heights from 5 to 45 micrometers in height. The depth of dishing for each sample was averaged. The results obtained were as follows:

| | |
|---|---|
| COMP-1 | 220 Å |
| COMP-2 | 200 Å |
| INVENTION-1 | 120 Å |

From this it is clear that the dishing is far less severe with the nano-alumina than with the other aluminas of the prior art.

EXAMPLE 3

In this Example the products evaluated in Example 1 were re-evaluated in a CMP slurry in which the slurry comprised 97 gm of ferric nitrate and 0.5 gm of benzotriazole dissolved in 2000 gm of deionized water. To this solution were added 2000 gm of a 10% alumina dispersion in deionized water. The aluminas are described below.

| ALUMINA SOURCE | Cu REMOVAL | Oxide REMOVAL | SELECTIVITY |
|---|---|---|---|
| COMP-3 | 14180 Å/Min | 31 Å/Min | 457.4 |
| COMP-4 | 13471 Å/Min | 30 Å/Min | 449 |
| INVENTION-2 | 1175 Å/Min | 8 Å/Min | 147 |

The alumina used in Comp-3 was obtained from Saint-Gobain Industrial Ceramics, Inc. under the product code SL 9245. The particle size was of the order of 100 nanometers or so with a wide particle size range. It was obtained by the Bauer process described above. It was thus the same as was used in Comp-1.

The Comp-4 alumina was "Product Code Masterprep" purchased from Buehler Limited. It is believed to be predominantly gamma alumina. This was the alumina used in Comp-2 above.

The nano-alumina used is similar to the one used in Example 1 and was obtained by the process described above for the production of the nano-alumina used in Invention-1. It comprised however approximately 5% by weight of silica as a coating around the particles. The silica was added to a boehmite dispersion and the silica-coated boehmite particles were fired at 1150–1200° C. for 10 hours, after which the particles were cooled to room temperature and milled using zirconia media in a Drais mill with a polyurethane lining till the powder had a BET surface area of >80 $m^2$/gm.

The data shows that the rate of removal is reduced by comparison with the larger particle size alpha alumina or the gamma alumina product, (which were virtually identical), as a result of the smaller particle size. An adequate selectivity was however fully maintained. Thus when removing material to the pre-determined point, for example one at which an underlying layer is revealed, it becomes possible to identify the endpoint accurately and terminate the planarization appropriately.

What is claimed is:

1. A CMP process which comprises polishing a substrate comprising a metal and a non-conductive material using an abrasive that comprises an alumina powder in which the alumina particles of the powder have a silica coating and in which the powder has a BET surface area of at least 50 $m^2/gm$, an alumina content of at least 90% by weight said alumina having an alpha alumina content of at least 90% by weight and wherein at least 90% of the alumina particles have ultimate particle widths of not more than 50 nanometers with less than 10% having ultimate particle sizes greater than 100 nm.

2. A CMP process according to claim 1 in which the alpha alumina content of the alumina powder is at least 95%.

3. A CMP process according to claim 1 in which the silica content of the alumina abrasive is from 1 to 8 wt %.

4. A CMP process according to claim 1 in which the alumina abrasive is applied to a workpiece in the form of a slurry comprising from 2 to 7 wt % of the alumina.

5. A CMP process according to claim 1 in which the alumina abrasive is applied to the workpiece in the form of a fixed abrasive comprising the abrasive dispersed in a cured resin matrix.

6. A CMP process according to claim 5 in which the fixed abrasive has a profiled surface comprising a plurality of shaped structures.

7. A CMP slurry that comprises an alumina powder in which the alumina particles of the powder have a silica coating and in which the powder has a BET surface area of at least 50 $m^2/gm$, an alumina content of at least 90% by weight said alumina having an alpha alumina content of at least 90% by weight and wherein at least 90% of the particles have ultimate particle widths of from 20 to 50 nanometers with less than 10% having ultimate particle sizes greater than 100 nm.

8. An engineered abrasive suitable for use in CMP applications comprising a working surface which comprises a plurality of shaped structures obtained by curing a dispersion of alumina abrasive particles in a curable resin wherein the alumina abrasive particles have a silica coating, a BET surface area of at least 50 $m^2/gm$, an alumina content of at least 90% by weight said alumina having an alpha alumina content of at least 90% by weight and wherein at least 90% of the particles have ultimate particle widths of from 20 to 50 nanometers with less than 10% having ultimate particle sizes greater than 100 nm.

* * * * *